US012772127B2

(12) United States Patent
Deng

(10) Patent No.: US 12,772,127 B2
(45) Date of Patent: Oct. 20, 2026

(54) MOBILITY MANAGEMENT SYSTEM AND MOBILITY MANAGEMENT METHOD OF A BASE STATION

(71) Applicant: SAMSUNG ELECTRONICS CO., LTD., Suwon-si (KR)

(72) Inventor: Jie Deng, Suzhou (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 373 days.

(21) Appl. No.: 18/432,406

(22) Filed: Feb. 5, 2024

(65) Prior Publication Data

US 2024/0323782 A1 Sep. 26, 2024

(30) Foreign Application Priority Data

Mar. 24, 2023 (CN) ......................... 202310301456.0

(51) Int. Cl.
*H04W 36/08* (2009.01)
*H04W 36/32* (2009.01)

(52) U.S. Cl.
CPC ......... *H04W 36/08* (2013.01); *H04W 36/324* (2023.05)

(58) Field of Classification Search
CPC ............... H04W 36/08; H04W 36/324; H04W 36/008375; H04W 36/32; H04W 4/029;
(Continued)

(56) References Cited

U.S. PATENT DOCUMENTS 8,391,227 B2 3/2013 Choi et al.
10,736,007 B2 8/2020 Izui et al.
(Continued)

FOREIGN PATENT DOCUMENTS

CN 108093449 A 5/2018
WO 2021/019498 A1 2/2021

OTHER PUBLICATIONS

3GPP TR37.817-h00, "3rd Generation Partnership Project; Technical Specification Group Radio Access Network; Evolved Universal Terrestrial Radio Access (E-UTRA) and NR; Study on enhancement for Data Collection for NR and EN-DC (Release 17)," 2022.
(Continued)

*Primary Examiner* — Kiet Tang
(74) *Attorney, Agent, or Firm* — Morgan, Lewis & Bockius LLP

(57) ABSTRACT

In a mobility management system and a mobility management method of a base station, position data of a connected target terminal in a cell of the base station is acquired and based thereon a moving track of the terminal is generated and the terminal's speed is determined. Based on a matching degree of the moving track of the terminal with respect to at least one track model corresponding to the speed of the terminal, a track model is selected, for which the matching degree meets a first preset condition from among the at least one track model. An initial matching degree of the moving track of the terminal with respect to the specific track model is obtained; future position data of the terminal is predicted; the initial matching degree is updated; it is determined whether the terminal is to be connected to another base station.

20 Claims, 5 Drawing Sheets

(58) Field of Classification Search
CPC ......... H04W 36/0058; H04W 36/0085; H04W 36/30
See application file for complete search history.

(56) References Cited

U.S. PATENT DOCUMENTS

| | | | |
|---|---|---|---|
| 10,736,009 B2 | 8/2020 | Xu et al. | |
| 2007/0149197 A1 | 6/2007 | Lee et al. | |
| 2012/0082058 A1* | 4/2012 | Gerstenberger | H04W 36/00837 370/252 |
| 2012/0178455 A1* | 7/2012 | Sato | H04W 36/324 455/436 |
| 2020/0196206 A1 | 6/2020 | Chiu et al. | |
| 2020/0213925 A1 | 7/2020 | Lin | |
| 2021/0211946 A1* | 7/2021 | Li | H04W 36/00835 |
| 2022/0386209 A1 | 12/2022 | Roeland et al. | |
| 2023/0209394 A1* | 6/2023 | Ma | H04W 28/0268 370/235 |

OTHER PUBLICATIONS

First Office Action issued Mar. 12, 2026 in corresponding Chinese Patent Application No. 202310301456.0.

Notice of Allowance issued Apr. 24, 2026 in corresponding Chinese Patent Application No. 202310301456.0.

* cited by examiner (Comparative Example)

MOBILITY MANAGEMENT SYSTEM AND MOBILITY MANAGEMENT METHOD OF A BASE STATION

CROSS-REFERENCE TO RELATED APPLICATION(S)

This application is related to and claims priority to Chinese patent application no. 202310301456.0, filed in the Chinese Intellectual Property Office on Mar. 24, 2023, the entire contents of which are incorporated herein by reference in its entirety.

TECHNICAL FIELD

This disclosure relates generally to mobile communications, and more particularly to a mobility management system and a mobility management method of a base station.

DISCUSSION OF RELATED ART

A base station in service today may have no predictive ability for mobility management of terminals. Currently, mobility management for terminals may depend on cell measurements and control of terminals. To this end, a terminal may continuously measure some physical quantities of its cell and adjacent cells, and then report the same to a base station. The base station determines whether the terminal should remain in its current cell or initiate a handover of the terminal's connection (hereinafter, "terminal handover" or "cell handover") to an adjacent base station ("cell") according to a specific situation, so as to perform mobility management.

With the increasing speed of vehicles, high speed railway trains with speeds of, e.g., 350 km/h have become popular in various corners of the world. At present, Fifth Generation New Radio Frequency Range 2 (5G NR FR2) band has reached 36 GHz~71 GHz, and sub-terahertz bands such as 140 GHz~300 GHz and 0.1 THz~10 THz are projected to be used in the future. The loss function Lbs for radio wave propagation in free space as a function of frequency F and moving distance D may be calculated as: Lbs=32.45+20 lgF (MHz)+20 lgD (km). Thus, at higher frequencies and speeds, signal loss is higher and the timeliness of the cell measurements by the terminal is worse. Consequently, the measurement accuracy for the current channel is lower, whereby the judgment made by the base station at a current time, based on measurement in the past, becomes more and more inaccurate.

Frequent cell measurements by the terminal and the base station leads to increased power consumption. Generally, after a terminal accesses a cell, the base station configures the measurement control message to the terminal. Since the base station does not know the specific location of the terminal, and the base station does not know when the terminal moves to the edge of the cell, in a current mobile communication system, the terminal continuously performs the measurement procedure prior to a handover. When the terminal moves to the edge of the cell and sends the measurement report to the base station, the base station performs mobility management to implement terminal handover to an adjacent cell. This measurement by the terminal is carried out in milliseconds every time, and the measurement continues until the handover procedure is completed. When the terminal is on a high speed railway train in a high-speed moving process, the handover will become very frequent, which inevitably leads to the continuous measurement by the terminal, greatly increasing the power consumption of the terminal. This is the main reason why the power consumption of today's mobile phones is particularly high when used on a high speed railway train. With the ubiquity of mobile phones and their usage rates the increase in power consumption of mobile phones does not conform to the developmental ideal of low-carbon output, environment-friendly and green technology today and in the future.

Moreover, current handover procedures suffer from a short interruption of service, which has a great impact on delay-sensitive services (such as real-time games), resulting in poor user experience of the terminal. As an example, on the high speed railway train of China, under the 4G network system, when the high speed railway train moves at a high speed, users are basically unable to play delay-sensitive games.

SUMMARY

According to an aspect of the present disclosure, a mobility management system of a base station includes data acquiring circuitry configured to acquire position data of a connected target terminal in a cell of the base station, and based on the acquired position data, generate a moving track of the target terminal and determine a speed of the target terminal; track model selecting circuitry configured to, based on a matching degree of the moving track of the target terminal with respect to at least one track model corresponding to the speed of the target terminal, select a specific track model of which the matching degree meets a first preset condition from among the at least one track model, and obtain an initial matching degree of the moving track of the target terminal with respect to the specific track model; and mobility management circuitry configured to predict future position data of the target terminal based on the specific track model, update the initial matching degree based on the predicted future position data, and determine whether the target terminal is to be connected to another base station according to the specific track model based on the updated matching degree. The at least one track model may define a track for a terminal's handover from the base station to a different base station while traveling at the determined speed, and of which an end point is a position at the handover time.

Each of the following options may be implemented individually or in combination with at least one other one of the options:

The track model selecting circuitry may be configured to determine the matching degree of the moving track of the target terminal with respect to the at least one track model by determining an overlapping degree of the moving track of the target terminal with each of the at least one track model.

The mobility management system may further include: track storing circuitry configured to, when the target terminal is handed over to the other base station, store a predefined moving track of the target terminal in the cell as one of moving tracks corresponding to the speed of the target terminal and the other base station, wherein the predefined moving track is a set of position data that has passed a predetermined period before the handover time.

The track storing circuitry may be further configured to generate and store track models by: extracting at least one moving track from among one or more moving tracks stored for a specific base station, wherein the difference between speeds corresponding to the extracted moving tracks do not exceed a preset speed error, and the difference between moving directions of the extracted moving tracks do not exceed a preset direction error; synthesizing the extracted moving tracks into one track; and storing the synthesized track as a track model for the specific base station, and storing a speed statistics value of the speeds corresponding to the extracted moving tracks as a speed corresponding to the track model for the specific base station.

The track storing circuitry may be further configured to: re-generate and re-store track models in the case that a predetermined update condition is met, wherein the predetermined update condition may include at least one of the number of moving tracks stored for the specific base station reaching a predetermined number, a predetermined period being passed, and a new base station appearing in an adjacent area of the base station.

The mobility management circuitry may be configured to: when the updated matching degree meets a second preset condition, determine that the target terminal is to be connected to the other base station.

The second preset condition may include at least one preset threshold condition increasing progressively, wherein: when current matching degree of the moving track of the target terminal with respect to the specific track model meets a preset threshold condition of a current level, the data acquiring circuitry may acquire the next position data of the target terminal at a time interval corresponding to the preset threshold condition of the current level, and the mobility management circuitry may update the current matching degree based on comparison between the predicted next position data and the acquired next position data, and may determine whether the updated matching degree meets a preset threshold condition of a next level, when the matching degree of the moving track of the target terminal with respect to the specific track model meets all preset threshold conditions, the mobility management circuitry may determine that the target terminal is to be connected to the other base station.

The mobility management circuitry may be configured to update the current matching degree by: if a distance between the predicted next position data and the acquired next position data does not exceed a preset distance error, adding a first preset value to the current matching degree; if the distance between the predicted next position data and the acquired next position data exceeds the preset distance error, subtracting a second preset value from the current matching degree.

The mobility management circuitry may be configured to: perform mobility management on the target terminal according to a legacy protocol, when the current matching degree of moving track of the target terminal with respect to the specific track model does not meet the preset threshold condition of the current level.

When it is determined that the target terminal is to be connected to the other base station, the target terminal may be connected to the other base station by Dual Connective (DC) or Coordinated Multipoint (COMP) configuration.

After the specific track model is selected, the data acquiring circuitry may be configured to: acquire position data of the target terminal in the cell at a greater time interval than that before the specific track model is selected.

According to another aspect of the disclosure, a mobility management method of a base station is provided, the mobility management method may include: acquiring position data of a connected target terminal in a cell of the base station, and based on the acquired position data, generating a moving track of the target terminal and determining a speed of the target terminal; selecting, based on a matching degree of the moving track of the target terminal with respect to at least one track model corresponding to the speed of the target terminal, a specific track model of which the matching degree meets a first preset condition from among the at least one track model, and obtaining an initial matching degree of the moving track of the target terminal with respect to the specific track model; predicting future position data of the target terminal based on the specific track model, updating the initial matching degree based on the predicted future position data, and determining whether the target terminal is to be connected to another base station corresponding to the specific track model based on the updated matching degree. The at least one track model may define a track for a terminal's handover from the base station to a different base station while traveling at the determined speed, and of which an end point is a position at the handover time.

The above-summarized mobility management method may be analogously augmented with operations according to the above-noted options delineated with respect to the mobility management system.

According to still another aspect of the disclosure, a computer-readable storage medium storing computer program instructions is provided, wherein the computer program instructions, when executed by a processor, cause a base station to implement the mobility management method summarized above.

According to various embodiments of the disclosure, the mobility management of the terminal is implemented by using the track models, which can not only reduce the power consumption of the base station and the terminal, but also improve the user experience of the terminal.

BRIEF DESCRIPTION OF THE DRAWINGS

The above and other aspects, features and advantages of the present disclosure will be more clearly understood through the following description of exemplary embodiments taking in conjunction with the accompanying drawings in which.

DETAILED DESCRIPTION

Figure 1:
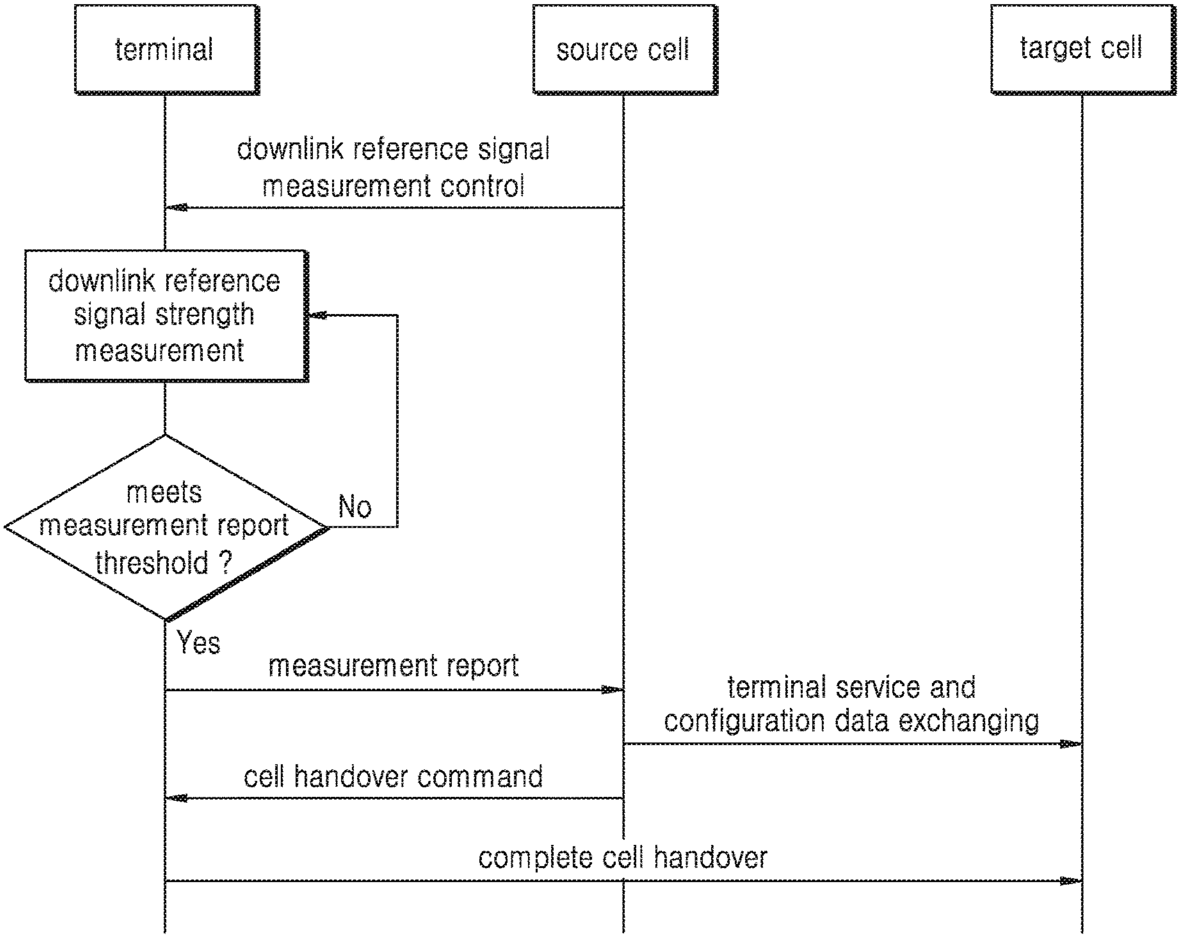
FIG. 1 is a diagram illustrating cell handover based on downlink reference signal measurement, according to a comparative example.

FIG. 1 is a diagram illustrating cell handover based on a downlink reference signal measurement, according to a comparative example.

As illustrated in FIG. 1, a conventional mobility management may be simply divided into the following three procedures: measurement configuration procedure, measurement performing and reporting procedure of a terminal, and handover procedure.

In the measurement configuration procedure, a base station of a source cell may send downlink reference signal measurement control to the terminal. In the measurement performing and reporting procedure of the terminal, the terminal may measure the strength of the downlink reference signal at a specific frequency. When the measurement result meets a measurement report threshold, the terminal may send a measurement report to the base station. In the handover procedure, the base station of the source cell may send terminal services and configuration data to a base station of a target cell, and send cell handover commands to the terminal. Then, the terminal may disconnect from the source cell and establish a connection with the target cell to complete cell handover.

However, for a terminal at the edge of the cell, especially a terminal moving fast, as the radio spectrum frequency increases to the FR2 band, sub-terahertz and even terahertz band, antenna beam energy decays more significantly at the air interface (the free space path between the terminal and the base station). Further, the channel indicators change more rapidly and violently, the wireless mobile communication mobility management procedure defined by, e.g., the 3GPP protocol currently will expose more deficiencies, and it is difficult to control the energy consumption of the terminal and the base station using conventional techniques.

Embodiments of the inventive concept may provide a "multi-base station" prediction mechanism (a prediction mechanism implemented individually by each of multiple base stations in a network) for terminal mobility management at the edge of cell. A future network (for example, 6G network) will have native artificial intelligence (AI) and machine learning (ML). Each base station may be trained based on a large amount of terminal information data processed in the past, analyze terminals' behavior, and generate a final behavior model. For instance, each base station may have a real self-optimization function of network parameters. Each base station may generate its own unique behavior model to predict the mobility management of a terminal that conforms to the behavior model, thereby reducing the measurement frequency between the base station and the terminal, and consequently reducing energy consumption. In addition, the terminal ready for handover at the cell edge may be configured in advance to enter a state such as dual connection (DC) or COMP (Coordinated Multipoint Transmission/Reception), so that terminal services may be switched without interruption, thereby improving the user experience of the terminal. A mobility management system and a mobility management method of a base station according to an exemplary embodiment of the disclosure will be described in detail below in connection with FIGS. 2 to 5.

Figure 2:
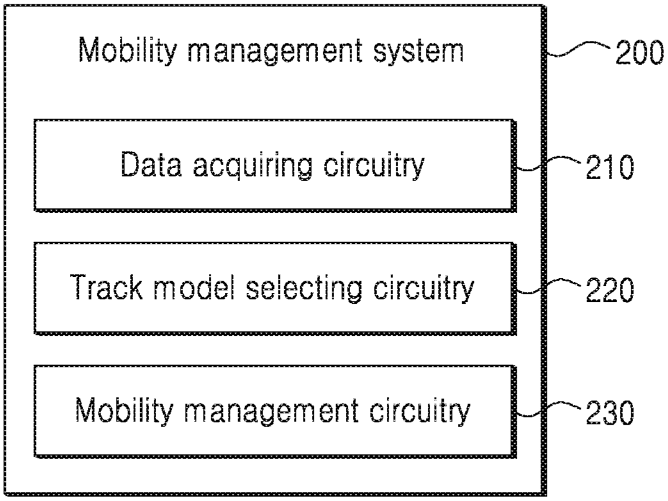
FIG. 2 is a schematic block diagram illustrating a communication system of a base station according to an exemplary embodiment of the disclosure.

FIG. 2 is a schematic block diagram illustrating a mobility management system 200 of a base station according to an exemplary embodiment of the disclosure.

The mobility management system 200 according to the exemplary embodiment may be installed in various base stations to implement the mobility management of the terminal. The mobility management system 200 may include data acquiring circuitry 210, track model selecting circuitry 220, and mobility management circuitry 230.

The data acquiring circuitry 210 may acquire position data of a connected target terminal in a cell of the base station, and based on the acquired position data, generate a moving track of the target terminal and determine a speed of the target terminal. The base station may have capability of "positioning" the terminal (determining the terminal's position), and may acquire the position data of the target terminal. For example, after the target terminal enters the cell, or when the target terminal moves within the cell, or after obtaining a permission from the terminal user, the base station may acquire the position data of the target terminal at a default time interval or a "first time interval" (for example, every 10 ms) (the first time interval may be dynamically determined). For example, the data acquiring circuitry 210 may estimate the angle $\alpha$ of the arrival wave according to the direction of the uplink arrival wave of the target terminal (for example, estimate a according to an uplink sounding reference signal (SRS) or according to a reference signal used for demodulating by the base station), then, the distance d between the terminal and the base station is estimated according to the delay of uplink arrival wave of the terminal, thereby the position data of the target terminal may be acquired. In addition, the data acquiring circuitry 210 may determine the speed of the target terminal based on the time interval of acquiring the position data and the acquired position data. The generated moving track of the target terminal may be a set of the position data or a continuous track obtained by fitting based on the position data.

The track model selecting circuitry 220 may, based on a matching degree of the moving track of the target terminal with respect to at least one track model corresponding to the speed of the target terminal, select a specific track model of which the matching degree meets a first preset condition from among the at least one track model, and obtain an initial matching degree of the moving track of the target terminal with respect to the specific track model. Here, the at least one track model may define a track for a terminal's handover from the base station to another base station while the terminal travels at the determined speed, and of which an end point is a position at the time of the handover. The track model selecting circuitry 220 may start to select a track model for the target terminal when the target terminal moves to a predetermined edge area of the cell, or when the target terminal exceeds a predetermined speed, or when the network signal of the target terminal is poor. Alternatively, the track model selecting circuitry 220 may be continuously selecting a track model for the target terminal in the cell while the target terminal is connected to the base station of the cell ("connected to the cell").

For instance, the track model selecting circuitry 220 may determine the matching degree of the moving track of the target terminal with respect to the at least one track model by determining an overlapping degree of the moving track of the target terminal with each of the at least one track model. For example, the track model selecting circuitry 220 may determine the ratio of the overlapping part of the moving track of the target terminal with each track model to the length of the corresponding track model, as the matching degree. For example, the track model selecting circuitry 220 may select at least one track model of which the matching degree meets a first preset condition (for example, 30%) from among a plurality of track models, and select a track model of which the speed is the same as that of the target terminal from among the selected at least one track model, as the specific track model. As another example, the track model selecting circuitry 220 may select at least one track model of which the speed is the same as that of the target terminal from among the plurality of track models, and select a track model of which the matching degree meets the first preset condition from among the selected at least one track model.

The mobility management circuitry 230 may predict future position data (e.g., next position data) of the target terminal based on the specific track model, update the initial matching degree based on the predicted future position data, and determine whether the target terminal is to be connected to another base station corresponding to the specific track model based on the updated matching degree. When the updated matching degree meets a second preset condition, the mobility management circuitry 230 may determine that the target terminal is to be connected to the other base station. When the updated matching degree does not meet the second preset condition, the mobility management circuitry 230 may perform mobility management on the target terminal according to a legacy protocol (for example, the 3GPP protocol).

In an exemplary embodiment of the disclosure, based on the first preset condition described above, a plurality of specific track models may be finally selected. In this case, the mobility management circuitry 230 may perform the above operations simultaneously based on the plurality of specific track models respectively, and when the updated matching degree does not meet the first preset condition, terminate the application of the corresponding specific track model.

Herein, the second preset condition described above may include at least one preset threshold condition increasing progressively. For example, the at least one preset threshold condition may be 30% (a first level), 60% (a second level), 90% (a third level). In another example, there is only one threshold. When current matching degree of the moving track of the target terminal with respect to the specific track model meets a preset threshold condition of a current level, the data acquiring circuitry 210 may acquire the next position data of the target terminal at a time interval corresponding to the preset threshold condition of the current level, and the mobility management circuitry 230 may update the current matching degree based on comparison between the predicted next position data and the acquired next position data, and determine whether the updated matching degree meets a preset threshold condition of a next level. For example, when the current matching degree of the moving track of the target terminal with respect to the specific track model meets the preset threshold condition of the first level, the data acquiring circuitry 210 may acquire the next position data of the target terminal at the time interval corresponding to the preset threshold condition of the first level (for example, a second time interval, 100 ms), and the mobility management circuitry 230 may update the current matching degree based on the comparison between the next position data predicted by the specific track model and the acquired next position data, and determine whether the updated matching degree meets the preset threshold condition of the second level. When the matching degree meets the preset threshold condition of the second level, the data acquiring circuitry 210 may acquire the next position data of the target terminal at the time interval corresponding to the preset threshold condition of the second level (for example, a third time interval, 200 ms). When the matching degree meets the preset threshold condition of the third level (>90%), the data acquiring circuitry 210 may acquire the next position data of the target terminal at a larger time interval, or in special cases, it will not acquire the next position data of the target terminal any more (e.g., corresponding to a condition in which the time interval corresponding to the preset threshold condition of the third level is set to an infinite length). Here, the time interval corresponding to the preset threshold condition may increase as the level of the preset threshold condition increases, thereby lessening the increase in power consumption caused by frequent measurements of the terminal and the base station.

The mobility management circuitry 230 may update the current matching degree by adding a first preset value to the current matching degree, if a distance between the predicted next position data and the acquired next position data does not exceed a preset distance error. The mobility management circuitry 230 may subtract a second preset value from the current matching degree, if the distance between the predicted next position data and the acquired next position data exceeds the preset distance error. Here, the preset distance error may be related to positioning accuracy, etc. The first preset value may be the same as or different from the second preset value. The first preset value and the second preset value may be related to the corresponding time interval for acquiring position data, etc.

When the matching degree of the moving track of the target terminal with respect to the specific track model meets all preset threshold conditions, the mobility management circuitry 230 may determine that the target terminal is to be connected to another base station corresponding to the specific track model (assuming the other base station can handle the additional connection). When it is determined that the target terminal is to be connected to the other base station, the target terminal may be connected to the other base station by Dual Connective (DC) or Coordinated Multipoint (COMP) configuration. When the current matching degree of the moving track of the target terminal with respect to the specific track model does not meet the preset threshold condition of the current level, the mobility management circuitry 230 may perform mobility management on the target terminal according to a legacy protocol (e.g., 3GPP protocol).

In addition, the mobility management system 200 may further include track storing circuitry (not shown) to store predefined moving tracks of terminals, and generate and store track models. When the target terminal "handovers" to the other base station (meaning that the target terminal's connection is handed over to the other base station), the track storing circuitry may store a predefined moving track of the target terminal in the cell as one of moving tracks corresponding to the speed of the target terminal and the other base station. The predefined moving track may be a set of position data that has passed a predetermined period before the handover time.

According to an embodiment of the disclosure, the base station may allocate a storage space with a fixed size to each terminal (for example, terminal 1, terminal 2, etc.) accessing the cell, to record the position data of the terminal. To prevent the terminals that reside in the cell for a long time without handover from occupying too much storage space, a storing method of cyclic covering may be used. To this end, when the position data of the terminal is recorded to the end of the storage space allocated for it, the new position data of the terminal may overwrite and be stored from the start of the storage space. When the terminal handovers from the current cell to an adjacent cell, the set of the position data that has passed a predetermined period before the position data at the handover time is the final moving track of the terminal handover from the current cell to the adjacent cell. For example, when the terminal 1 moves from the base station to another base station, the base station may continuously store the position data of the terminal 1 in the storage space allocated to the terminal 1. When the terminal 1 handovers from the base station to the other base station, for example, the position information recorded at the end time of handover is $[\alpha_{ho}, d_{ho}]$, and 0<=ho<=max (maximum size of the storage space), the predefined moving track of terminal 1 stored (backtracked) by the base station is:

terminal 1 $\{[\alpha_{max-ho}, d_{max-ho}], \ldots, [\alpha_{ho-1}, d_{ho-1}], [\alpha_{ho}, d_{ho}]\}$. Here, the moving track of terminal 1 may be recorded as "moving track 1".

It is noted that the above way of storing the position data of the terminal is only an example, and the position data of the terminal may also be stored in other ways according to various factors such as the capacity of the base station, service requirements, etc.

According to an embodiment of the disclosure, the base station may divide all moving tracks of terminals that handover and move to another base station into a group, and the storage space of the group of moving tracks may be recorded as "base station path 2". If there are other base stations near the base station (for example, base station 3, base station 4, etc.), similarly, storage spaces of moving tracks of terminals that handover and move to the other base stations may be recorded as "path base station X" (for example, path base station 3, path base station 4, etc.) respectively. The base station may group the data of these terminals according to paths and then store them locally, used for the track storing circuitry to count and extract feature values and generate track models. Here, the feature values may be the directions of the moving tracks of the terminals, the speeds of the terminals, etc., for classifying the moving tracks according to the directions and speeds of the terminals.

On the other hand, considering that the base station may be unable to record all moving tracks of terminals' handover to the X-th base station without limitation, the base station may allocate a storage space with a fixed size for each "base station path X". For example, the base station may record up to UEmax terminals for each "base station path X". The storage space of each "base station path X" may also adopt the method of cyclic recording. For instance, when the storage space is full, it may be overwritten from the front, for example, a moving track of a (UEmax+1)-th terminal may cover the moving track of the 1-th terminal.

Note that the above way of storing the moving tracks of the terminals' handover to the X-th base station is only an example. The moving tracks of the terminals' handover to the X-th base station may also be stored in other ways according to various factors such as the capacity of the base station, service requirements, etc.

Based on the stored moving tracks of the terminals, the track storing circuitry may generate and store track models by: extracting at least one moving track from among one or more moving tracks stored for a specific base station, wherein the difference between speeds corresponding to the extracted moving tracks do not exceed a preset speed error, and the difference between moving directions of the extracted moving tracks do not exceed a preset direction error; synthesizing the extracted moving tracks into one track; and storing the synthesized track as a track model for the specific base station, and storing a speed statistics value of the speeds corresponding to the extracted moving tracks as a speed corresponding to the track model for the specific base station. For example, after the storage space of the "base station path 2" of the base station is recorded from empty to full, the process of generating and storing track models may be started. In addition, the preset speed error and the preset direction error may be set according to the positioning accuracy of the base station for terminals, etc.

In addition, considering the problem of data aging, in the case that a predetermined update condition is met, the track model storing circuitry may further re-generate and re-store track models, in other words, update the stored track models. The predetermined update condition includes at least one of: the number of moving tracks stored for the specific base station reaching a predetermined number, a predetermined period being passed, and a new base station appearing in an adjacent area of the base station.

For example, the process of generating/updating and storing track models should be triggered after the storage space of the "base station path 2" of the base station is circularly recorded to full again or after a predetermined time (for example, 3 days or 7 days, etc.), to ensure the timeliness of extracting feature values of moving tracks of terminals. For example, it may prevent the change of the high speed rail or highway route from affecting the application of the track models. In addition, after the base station is activated, the base station may acquire position coordinates (for example, GPS coordinates) of all base stations in the adjacent area by the interface between the base stations (e.g., the interface between LTE base stations, called an X2 interface). The base station may generate an area map according to its own position coordinate. For example, in the area map of the base station, there may be adjacent cell base stations of the base station (for example, a second base station, a third base station, etc.). However, after, for example, a period of time, some adjacent cell base stations (for example, the third base station) of the base station may be removed. In this case, the base station may, for example, delete the data of "base station path 3" and its corresponding track models according to the situation. Or, a new base station (for example, a fourth base station) may be built in the adjacent cell of the base station, and in this case, the base station may start the process of generating and storing track models for the new fourth base station.

An example process of generating/updating and applying track models will be described below in combination with FIG. 3.

Figure 3:
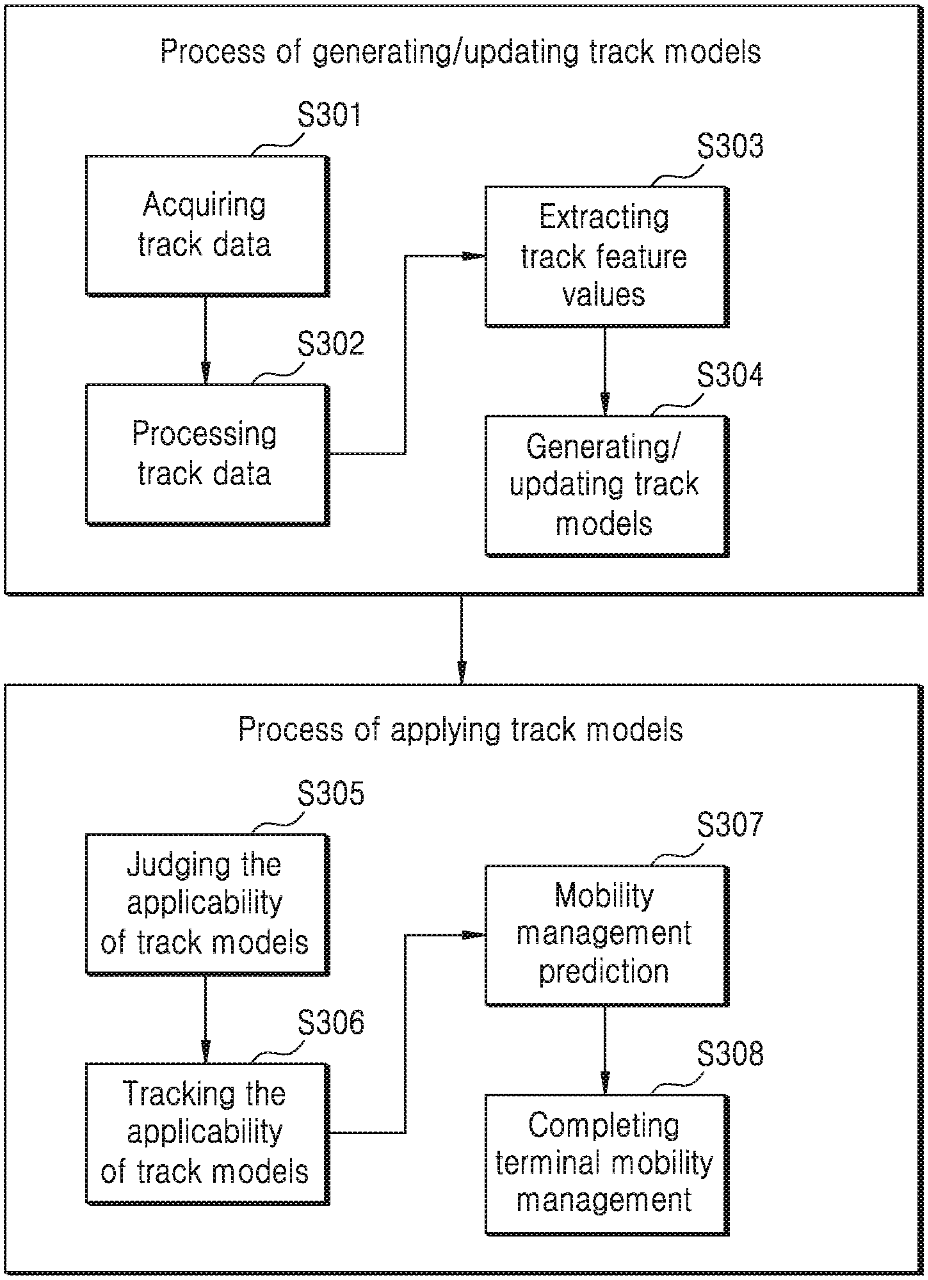
FIG. 3 is a diagram illustrating a process of generating/updating and applying track models according to an exemplary embodiment of the disclosure.

FIG. 3 is a diagram illustrating a process of generating/updating and applying track models according to an exemplary embodiment of the disclosure.

As illustrated in FIG. 3, in the process of generating/updating track models, in the case that the predetermined update condition is met, in operation S301 of acquiring track data, the base station with the mobility management system 200 installed may acquire a large number of moving tracks for a predefined time (which may be referred to as predefined moving tracks, for short) of the connected terminals in its cell. The predefined moving track is a set of position data that has passed a predetermined period before the handover time of the terminal. At operation S302 of processing the track data, the base station may process the acquired predefined moving tracks. For example, it may classify the acquired predefined moving tracks according to the base station path. In addition, the base station may allocate a storage space with a fixed size for each "base station path X", and may also allocate a sub storage space with a fixed size for each terminal under "base station path X". The storage space and the sub storage space may store data by adopting the method of cyclic covering. In operation S303 of extracting track feature values, the base station may extract the feature values of these moving tracks, where the feature values may include the moving directions of the moving tracks and the speeds of the terminals corresponding to the moving tracks. For example, in the process of extracting feature values, the base station may extract feature values from the data of "base station path X" according to mathematical or statistical methods. For example, the extracted feature values may be a statistical average. The base station may extract at least one moving track from among one or more moving tracks stored for a specific base station according to the moving direction and speed.

As an example, to improve the efficiency of generating/updating track models, the base station may remove moving tracks of terminals with low-speed or non-moving terminals from a plurality of moving tracks in advance, before extracting the moving track.

In operation S304 of generating/updating track models, the base station may synthesize the at least one moving track into one track as one track model based on statistical methods. For example, the base station may use methods in machine learning for reference, to solve and avoid problems such as generalization, under fitting, over fitting, and deviation. Finally, the base station may obtain track models from a large number of the stored moving tracks.

After the generation/updating of the track model is completed, the base station may have stored a plurality of track models, such as "base station path2_1_feature value_120" (representing a track model 1 with a speed of 120 km/h from the base station to the second base station) track model, "base station path2_2_feature value_300" (representing the track model 2 with a speed of 300 km/h from the base station to the second base station) track model, "base station path3_1_feature value_100" (representing the track model 1 with a speed of 100 km/h from the base station to the third base station) track model, etc.

Based on the above generated/updated track models, in the process of applying track models, firstly at operation S305, the base station may judge the applicability of the track models. To this end, the base station may, based on a matching degree of the moving track of the target terminal with respect to at least one track model corresponding to the speed of the target terminal, select a specific track model of which the matching degree meets the first preset condition from among the at least one track model. Herein, the expression "corresponding to the speed of the target terminal" may mean: (i) equal to or approximate to the average speed of the target terminal in the latest time period; (ii) equal to or approximate to the maximum speed of the target terminal in the latest time period; or (iii) equal to or approximate to the speed of the target terminal at each time or a specific number of times in the latest time period, or the like.

In operation S306, the base station may trace the applicability of the selected specific track model. Here, the base station may update the matching degree based on the specific track model. Then, in operation S307, the base station may perform mobility management prediction based on the updated matching degree. When the updated matching degree meets the second preset condition, the target terminal is predicted to be connected to a base station corresponding to the specific track model. Finally, at operation S308, the target terminal may be connected to the corresponding base station by dual connection or COMP configuration to complete the terminal mobility management.

In addition, the above process of generating/updating track models may be performed simultaneously with the process of applying track models. For instance, as long as the preset update condition is met, the above process of generating/updating track models may be started.

Figure 4:
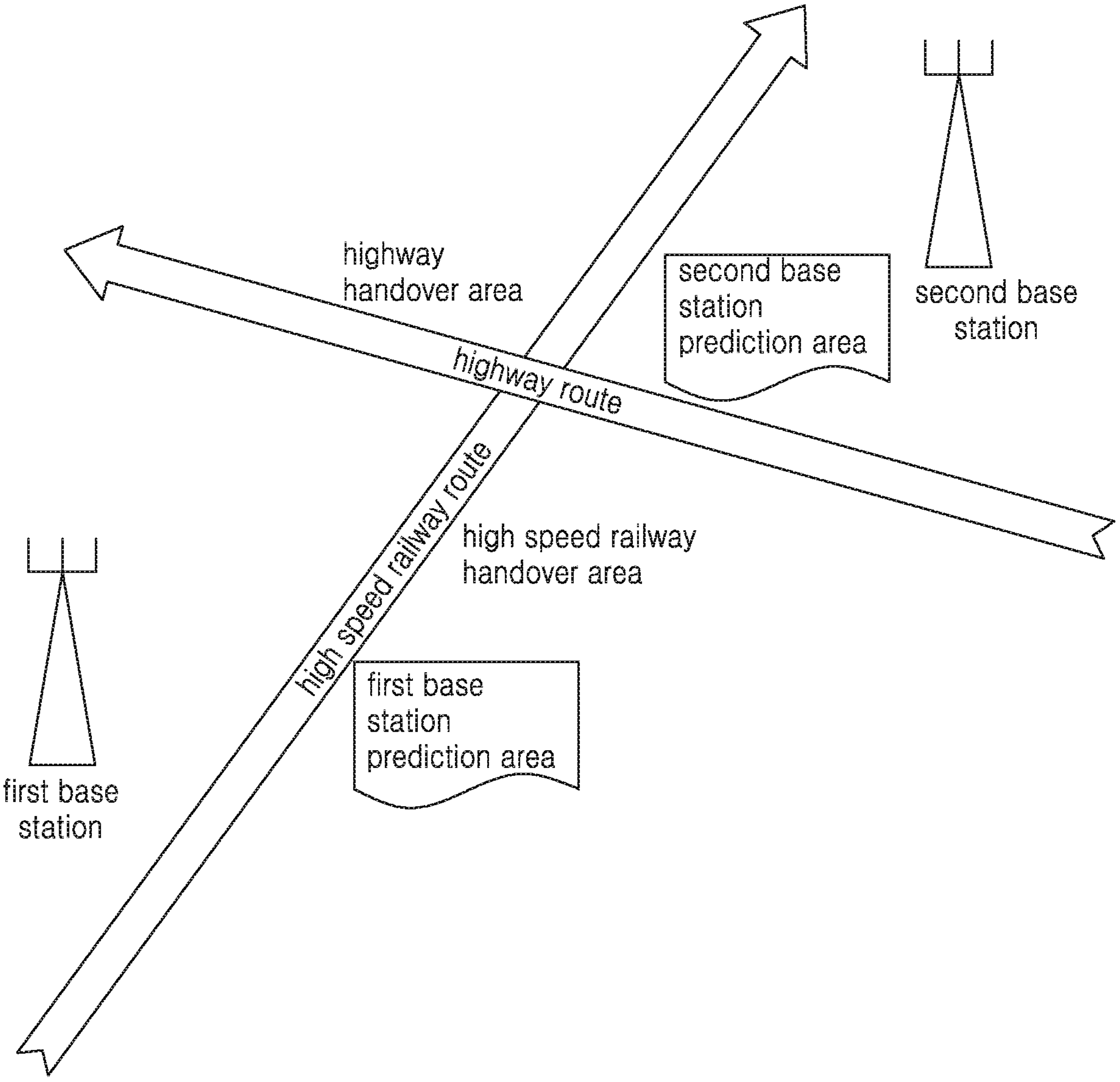
FIG. 4 is an exemplary schematic diagram illustrating an application scenario of the communication system according to an exemplary embodiment of the disclosure.

FIG. 4 is an exemplary schematic diagram illustrating an application scenario of the communication system 200 according to an exemplary embodiment of the disclosure.

As illustrated in FIG. 4, first and second base stations are shown, in which both are installed with the mobility management system 200. Firstly, the first base station and the second base station have stored their track models through the above process of generating/updating track models, e.g., the first base station has stored track models for a high speed rail route, and the second base station has stored track models for a highway route. For example, for the high speed railway route, there may be two different models (example corresponding speeds of terminals are 120 km/h and 300 km/h respectively), and the both models are on the same high speed railway route and may be recorded as "base station path2_feature value_120" and "base station path2_feature value_300" respectively.

The first base station may acquire the position data of each terminal in the first cell in real time according to the first time interval (for example, 10 ms), firstly, and based on the acquired position data, generate the moving track of each terminal and determine the speed of each terminal. The first base station may, based on a matching degree of the moving track of a terminal x with respect to at least one track model corresponding to the speed of the terminal x, select a specific track model of which the matching degree meets the first preset condition from among the at least one track model, for example, the specific track model is the above-described "base station path2_feature value_300" track model, and obtain an initial matching degree of the moving track of the terminal x with respect to the specific track model.

After selecting the specific track model, the first base station predicts that the terminal x will probably handover to the second base station corresponding to the specific track model, e.g., the first base station considers that the terminal x will probably enter a first base station prediction area shown in FIG. 4 (e.g., an area where the first base station predicts the next position data of the terminal based on the specific track model). For example, the terminal x may be added to a prediction queue which applies the "base station path 2_featurevalue_300" track model. The prediction queue is a set of terminals for which the first base station will acquire the future (e.g., next) position data of the terminals at a time interval different from the default time interval and predict the future position data of the terminals based on the specific track model. In this case, the first base station may acquire the next position data of the terminal x at a second time interval (for example, 100 ms) greater than the first time interval, and may predict the next position data of the terminal x based on the "base station path2_featurevalue_300" track model, and update the matching degree based on the comparison between the predicted next position data and the acquired next position data. Thus, the first base station no longer controls the terminal x in the prediction queue to send the traditional periodic or event report measurement, but only controls the terminal x to send a single measurement report for updating the matching degree at a necessary time point. After the specific track model is selected, the first base station may acquire the position data of the terminal x at a greater time interval than that before the specific track model is selected, to detect whether the position of terminal x is on or deviates from the specific track model, which greatly reduces the measurement process between the terminal and the base station.

In the first base station prediction area, the matching degree (may be expressed as "x_MatchRate") of terminal x with respect to the above specific track model may gradually increase over time. When x_MatchRate meets the second preset condition, for example, when x_MatchRate exceeds the second preset value (for example, 90%), the first base station considers that terminal x has moved to an area ready for handover to the second base station (for example, a high speed rail handover area as shown in FIG. 4). In this case, as an example, the first base station may send control plane and service plane information of the terminal x to the second base station in advance. Thus, when terminal x moves to the high speed rail handover area as shown in FIG. 4, the first base station may not send a handover command anymore, but instead, may send dual connection or COMP configuration information, to ensure that the service plane of the terminal is not interrupted when handover. In this case, according to the terminal capacity, the terminal may receive/send service data from/to the first base station and the second base station at the same time in a short time.

When x_MatchRate of the terminal x in the first base station prediction area decreases, if terminal x_MatchRate is lower than the first preset value (for example, 30%), the base station may remove the terminal x from the prediction queue applying the specific track model (in other words, terminate the application of the specific track model for terminal x), and perform mobility management on the terminal x according to the legacy protocol.

In addition, the transmission frequency of measurement result of the position data of the terminal (for example, the second time interval described above, 100 ms) may depend on the change speed of the position data of the terminal (i.e., the moving speed of the terminal). The higher the moving speed of the terminal, the more frequent the transmission. For example, in the case that the terminal moves fast, the second time interval may be appropriately reduced (for example, set to 60 ms).

In addition, as shown in FIG. 4, the second base station installed with the mobility management system 200 may also extract feature values based on the data of, for example, "base station path 1" in the same way as the first base station, to obtain a track model for the highway route, so as to perform mobility management on terminals connected to the second base station based on the track model for the highway route. Redundant discussion thereof is omitted for brevity.

Figure 5:
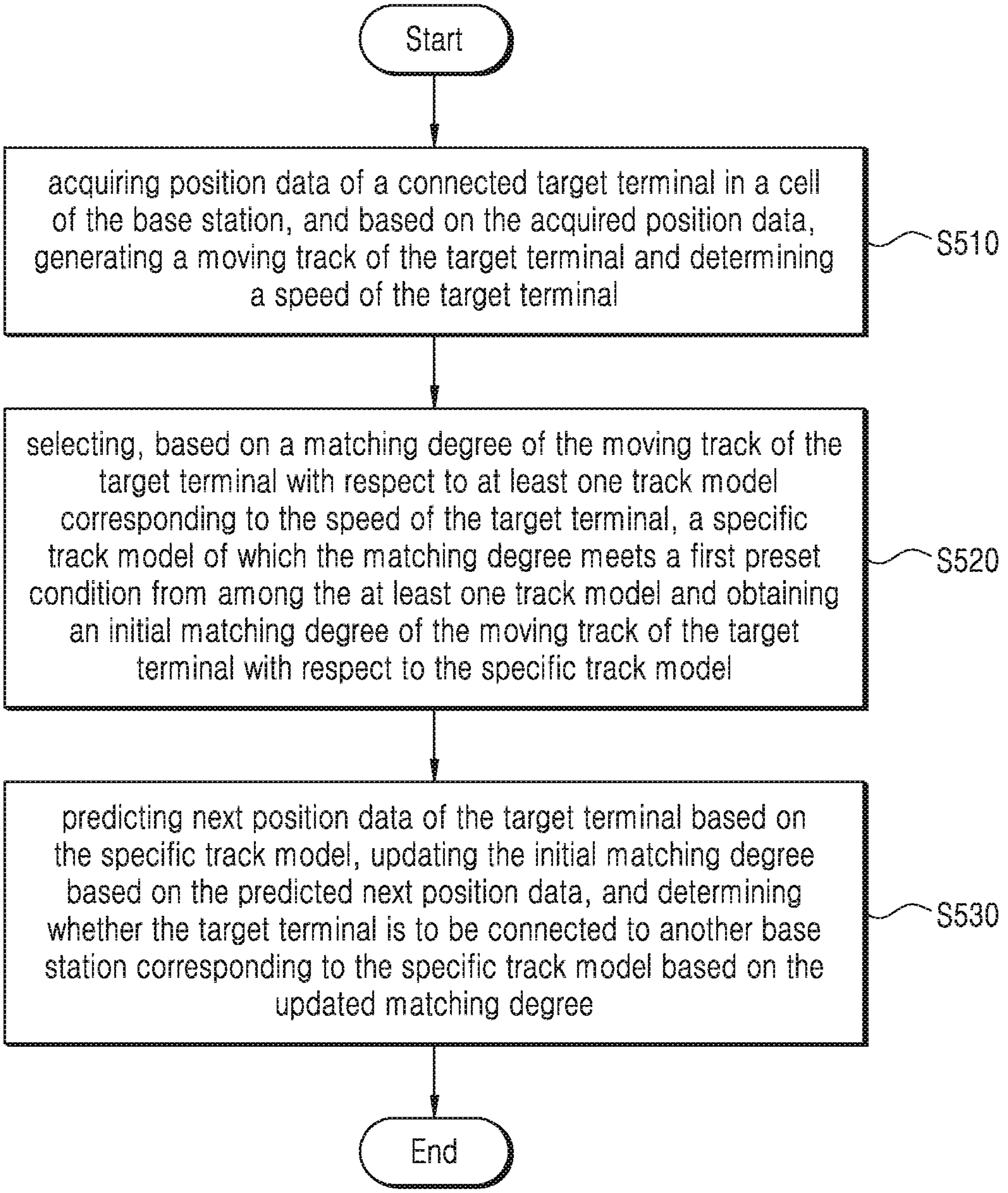
FIG. 5 is a flowchart illustrating a communication method of the base station according to an exemplary embodiment of the disclosure.

FIG. 5 is a flowchart illustrating a communication method of a base station according to an exemplary embodiment of the disclosure.

In operation S510, the data acquiring circuitry 210 may acquire position data of a connected target terminal in a cell of the base station, and based on the acquired position data, generate a moving track of the target terminal and determine a speed of the target terminal.

In operation S520, the track model selecting circuitry 220 may, based on a matching degree of the moving track of the target terminal with respect to at least one track model corresponding to the speed of the target terminal, select a specific track model of which the matching degree meets a first preset condition from among the at least one track model, and obtain an initial matching degree of the moving track of the target terminal with respect to the specific track model, wherein, the at least one track model is a track for a terminal's handover from the base station to other base station while traveling at the determined speed, and of which an end point is a position at the handover time.

At operation S530, the mobility management circuitry 230 may predict future (e.g., next) position data of the target terminal based on the specific track model, update the initial matching degree based on the predicted future position data, and determine whether the target terminal is to be connected to another base station corresponding to the specific track model based on the updated matching degree.

Herein, the above circuit units (circuitry such as 210, 220, 230) may be integrated into fewer circuit units or divided into more circuit units, to implement the same function. In addition, any of the above circuitry (e.g., 210, 220, 230) may be embodied as general purpose processing circuitry that executes software, or as dedicated hardware components, or a combination thereof.

According to the example embodiments of the disclosure, a computer-readable storage medium storing computer programs thereon may be provided, wherein the computer programs, when being executed, implement the mobility management method of the base station according to the example embodiments of the disclosure. Examples of computer-readable storage media herein include: a read-only memory (ROM), a random access programmable read-only memory (PROM), an electrically erasable programmable read-only memory (EEPROM), a random access memory (RAM), a dynamic random access memory (DRAM), a static random access memory (SRAM), a flash memory, a non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disk memory, hard disk drive (HDD), solid state disk (SSD), card type memory (such as multimedia card, security digital (SD) card or extreme digital (XD) card), tape, floppy disk, magneto-optical data storage device, optical data storage device, hard disk, solid state disk and any other device configured to store computer programs and any associated data, data files and data structures in a non-temporary manner and provide the computer programs and any associated data, data files and data structures to the processor or the computer so that the processor or the computer can execute the computer programs. The computer programs in the computer-readable storage medium described above may run in an environment deployed in a computer apparatus such as a client, host, agent device, server, etc. In addition, in one example, the computer programs and any associated data, data files, and data structures are distributed on a networked computer system, so that the computer programs and any associated data, data files, and data structures are stored, accessed, and executed in a distributed manner by one or more processors or computers.

According to example embodiments of the inventive concept, a base station may minimize the initiating of the terminal's measurement report, through use of track models, and update the matching degree by a single measurement report mechanism, which saves signaling overhead. For example, since the tracks of all terminals on a high speed railway train may conform to the specific track model of the base station, the mobility management performed by applying the specific track model will significantly reduce energy consumption that would otherwise occur in the legacy measurement between the terminal and the base station caused by handover based on measurement. As a result, systems and devices in accordance with the inventive concept conform to the concepts of low-carbon emissions, environment-friendly and green technology.

In addition, by applying handover technologies not based on the 3GPP protocol and the like, such as dual connection or COMP configuration, the terminal service is not interrupted in the cell handover area. This improves the user experience of the terminal service, especially for delay-sensitive services.

Because the base station may have native AI and ML capabilities, it does not need manual planning and a large number of network optimization tests, and the base station may be trained by itself through analysis of a large amount of data stored locally, to extract track models of its own geographic position. In other words, the base station may have a real self-optimization capability. The low orbit satellite chain system may also use the above-described method, to apply the method of the disclosure to aircrafts on a runway.

It should be understood that the inventive concept is not limited to the embodiments already described above and shown in the drawings, and that various modifications and changes may be made without departing from the scope of the inventive concept as defined by the appended claims.

What is claimed is:

1. A mobility management system of a base station, comprising:

data acquiring circuitry configured to acquire at a first time interval position data of a connected target terminal in a cell of the base station, and based on the acquired position data, generate a moving track of the target terminal and determine a speed of the target terminal;

track model selecting circuitry configured to, based on a matching degree of the moving track of the target terminal with respect to at least one track model corresponding to the speed of the target terminal, select a specific track model of which the matching degree meets a first preset condition from among the at least one track model, and obtain an initial matching degree of the moving track of the target terminal with respect to the specific track model;

wherein the data acquiring circuitry is further configured to, after the specific track model is selected, acquire future position data of the target terminal at a second time interval greater than the first time interval; and mobility management circuitry configured to predict future position data of the target terminal based on the specific track model, update the initial matching degree based on a comparison between the predicted future position data and the acquired future position data, and determine whether the target terminal is to be connected to another base station according to the specific track model based on the updated matching degree, wherein the at least one track model is stored by the base station and each of the at least one track model defines a track for a terminal's handover from the base station to a different base station while traveling at the determined speed, and of which an end point is a position at a time of the handover.

2. The mobility management system of claim 1, wherein the track model selecting circuitry is configured to determine the matching degree of the moving track of the target terminal with respect to the at least one track model by:

determining an overlapping degree of the moving track of the target terminal with each of the at least one track model.

3. The mobility management system of claim 1, further comprising: a track storing circuitry configured to, when the target terminal handovers to the other base station, store a predefined moving track of the target terminal in the cell as one of moving tracks corresponding to the speed of the target terminal and the other base station, wherein the predefined moving track is a set of position data that has passed a predetermined period before the time of the handover.

4. The mobility management system of claim 3, wherein the track storing circuitry is further configured to generate and store track models by:

extracting at least one moving track from among one or more moving tracks stored for a specific base station, wherein the difference between speeds corresponding to the extracted moving tracks do not exceed a preset speed error, and the difference between moving directions of the extracted moving tracks do not exceed a preset direction error;

synthesizing the extracted moving tracks into one track; and storing the synthesized track as a track model for the specific base station, and storing a speed statistics value of the speeds corresponding to the extracted moving tracks as a speed corresponding to the track model for the specific base station.

5. The mobility management system of claim 4, wherein the track storing circuitry is further configured to: re-generate and re-store track models when a predetermined update condition is met, wherein the predetermined update condition comprises at least one of the number of moving tracks stored for the specific base station reaching a predetermined number, a predetermined period being passed, and a new base station appearing in an adjacent area of the base station.

6. The mobility management system of claim 1, wherein the mobility management circuitry is configured to:

when the updated matching degree meets a second preset condition, determine that the target terminal is to be connected to the other base station.

7. The mobility management system of claim 6, wherein the second preset condition comprises at least one preset threshold condition increasing progressively, wherein:

when current matching degree of the moving track of the target terminal with respect to the specific track model meets a preset threshold condition of a current level, the data acquiring circuitry acquires the acquired future position data of the target terminal at the second time interval, the second time interval corresponding to the preset threshold condition of the current level, and the mobility management circuitry updates the current matching degree based on comparison between the predicted future position data and the acquired future position data, and determines whether the updated matching degree meets a preset threshold condition of a next level, when the matching degree of the moving track of the target terminal with respect to the specific track model meets all preset threshold conditions, the mobility management circuitry determines that the target terminal is to be connected to the other base station.

8. The mobility management system of claim 7, wherein the mobility management circuitry is configured to update the current matching degree by:

if a distance between the predicted future position data and the acquired future position data does not exceed a preset distance error, adding a first preset value to the current matching degree; and if the distance between the predicted future position data and the acquired future position data exceeds the preset distance error, subtracting a second preset value from the current matching degree.

9. The mobility management system of claim 7, wherein the mobility management circuitry is configured to: perform mobility management on the target terminal according to a legacy protocol, when the current matching degree of the moving track of the target terminal with respect to the specific track model does not meet the preset threshold condition of the current level.

10. The mobility management system of claim 1, wherein when it is determined that the target terminal is to be connected to the other base station, the target terminal is connected to the other base station by Dual Connective (DC) or Coordinated Multipoint (COMP) configuration.

11. The mobility management system of claim 1, wherein the second time interval depends on a moving speed of the target terminal.

12. A mobility management method of a base station, comprising:

acquiring, by the base station at a first time interval, position data of a connected target terminal in a cell of the base station, and based on the acquired position data, generating a moving track of the target terminal and determining a speed of the target terminal;

selecting, by the base station, based on a matching degree of the moving track of the target terminal with respect to at least one track model corresponding to the speed of the target terminal, a specific track model of which the matching degree meets a first preset condition from among the at least one track model, and obtaining an initial matching degree of the moving track of the target terminal with respect to the specific track model;

after selecting the specific track model, acquiring, by the base station, future position data of the target terminal at a second time interval greater than the first time interval; and predicting, by the base station, future position data of the target terminal based on the specific track model, updating the initial matching degree based on a comparison between the predicted future position data and the acquired future position data, and determining whether the target terminal is to be connected to another base station according to the specific track model based on the updated matching degree, wherein the at least one track model is stored by the base station and each of the at least one track model defines a track for a terminal's handover from the base station to a different base station while traveling at the determined speed, and of which an end point is a position at a time of the handover.

13. The mobility management method of claim 12, wherein the matching degree of the moving track of the target terminal with respect to the at least one track model is determined by:

determining an overlapping degree of the moving track of the target terminal with each of the at least one track model.

14. The mobility management method of claim 12, further comprising: when the target terminal handovers to the other base station, storing a predefined moving track of the target terminal in the cell as one of moving tracks corresponding to the speed of the target terminal and the other base station, wherein the predefined moving track is a set of position data that has passed a predetermined period before the time of the handover.

15. The mobility management method of claim 14, further comprising generating and storing track models by:

extracting at least one moving track from among one or more moving tracks stored for a specific base station, wherein the difference between speeds corresponding to the extracted moving tracks do not exceed a preset speed error, and the difference between moving directions of the extracted moving tracks do not exceed a preset direction error;

synthesizing the extracted moving tracks into one track; and storing the synthesized track as a track model for the specific base station, and storing a speed statistics value of the speeds corresponding to the extracted moving tracks as a speed corresponding to the track model for the specific base station.

16. The mobility management method of claim 15, further comprising: re-generating and re-storing track models in the case that a predetermined update condition is met, wherein the predetermined update condition comprises at least one of the number of moving tracks stored for the specific base station reaching a predetermined number, a predetermined period being passed, and a new base station appearing in an adjacent area of the base station.

17. The mobility management method of claim 12, wherein when the updated matching degree meets a second preset condition, it is determined that the target terminal is to be connected to the other base station.

18. The mobility management method of claim 17, wherein the second preset condition comprises at least one preset threshold condition increasing progressively, wherein:

when current matching degree of the moving track of the target terminal with respect to the specific track model meets a preset threshold condition of a current level, the second time interval corresponds to the preset threshold condition of the current level, and the current matching degree is updated based on comparison between the predicted future position data and the acquired future position data, and whether the updated matching degree meets a preset threshold condition of a next level is determined, when the matching degree of the moving track of the target terminal with respect to the specific track model meets all preset threshold conditions, it is determined that the target terminal is to be connected to the other base station.

19. The mobility management method of claim 18, wherein the updating of the current matching degree comprises:

if a distance between the predicted future position data and the acquired future position data does not exceed a preset distance error, adding a first preset value to the current matching degree; and if the distance between the predicted future position data and the acquired future position data exceeds the preset distance error, subtracting a second preset value from the current matching degree.

20. A non-transitory computer readable storage medium storing computer program instructions that, when executed by a processor, cause a base station to implement a mobility management method comprising:

acquiring, by the base station at a first time interval, position data of a connected target terminal in a cell of the base station, and based on the acquired position data, generating a moving track of the target terminal and determining a speed of the target terminal;

selecting, by the base station, based on a matching degree of the moving track of the target terminal with respect to at least one track model corresponding to the speed of the target terminal, a specific track model of which the matching degree meets a first preset condition from among the at least one track model, and obtaining an initial matching degree of the moving track of the target terminal with respect to the specific track model;

after selecting the specific track model, acquiring, by the base station, future position data of the target terminal at a second time interval greater than the first time interval; and predicting, by the base station, future position data of the target terminal based on the specific track model, updating the initial matching degree based on a comparison between the predicted future position data and the acquired future position data, and determining whether the target terminal is to be connected to another base station according to the specific track model based on the updated matching degree, wherein the at least one track model is stored by the base station and each of the at least one track model defines a track for a terminal's handover from the base station to a different base station while traveling at the determined speed, and of which an end point is a position at a time of the handover.

* * * * *